United States Patent [19]

Verheijen

[11] Patent Number: 4,696,960

[45] Date of Patent: Sep. 29, 1987

[54] COMPOSITION OF TRIGLYCIDYLISOCYANURATE WITH REDUCED TACKINESS

[75] Inventor: Egidius J. M. Verheijen, Born, Netherlands

[73] Assignee: Stamicarbon B.V., Geleen, Netherlands

[21] Appl. No.: 777,301

[22] Filed: Sep. 18, 1985

[30] Foreign Application Priority Data

Sep. 19, 1984 [NL] Netherlands ................ 8402868

[51] Int. Cl.$^4$ .............................................. C08K 5/34
[52] U.S. Cl. ................................................ 524/100
[58] Field of Search ............... 524/100; 525/438, 490; 528/216, 271

[56] References Cited

U.S. PATENT DOCUMENTS 4,471,108  9/1984  Belder et al. ................. 525/440
4,528,341  7/1985  Belder et al. ................. 525/440

FOREIGN PATENT DOCUMENTS 1474140  5/1975  United Kingdom .
2098231  11/1984  United Kingdom .

OTHER PUBLICATIONS

Dialog Abstract of Chemical Abstracts, vol. 84, No. 2, Jan. 12, 1976, p. 41.

Primary Examiner—John Kight
Assistant Examiner—Kriellion Morgan
Attorney, Agent, or Firm—Cushman, Darby & Cushman

[57] ABSTRACT

A composition of triglycidylisocyanurate, having reduced tackiness, consists of a solid mixture of at least triglycidylisocyanurate and a non-reactive polyester.

8 Claims, No Drawings

COMPOSITION OF TRIGLYCIDYLISOCYANURATE WITH REDUCED TACKINESS

The invention relates to a composition of triglycidylisocyanurate (hereinafter: TGIC) with reduced tackiness.

TGIC is a much used raw material and auxiliary in many chemical reactions, particularly in the preparation of polycondensation products (resins). In such uses it is often desirable for the TGIC to be used in a manageable solid form. In its preparation, however, TGIC is usually first obtained in a liquid form, upon which it must be crystallized. Unfortunately, this presents considerable problems. It is very hard for TGIC to crystallize out of its melt, and very small amounts of impurities stemming from the preparation even make crystallization virtually illusory. If a more or less solid product is obtained at all, it is sticky and vritually unmanageable. It is therefore customary for TGIC to be subjected to extreme and very expensive purification processes, while such a high degree of purity would as such not be necessary for the intended uses, provided the product could be obtained in a manageable solid form.

The object of the invention is to provide a solution for this problem. According to the invention a composition of TGIC with reduced tackiness consists of at least a solid mixture of TGIC and a non-reactive polyester. The TGIC content of this mixture is preferably 50% (wt) at most in order to achieve an effective reduction of the tackiness. The lower limit of the TGIC content is determined by economic considerations. Below 5% (wt) the TGIC content is too low for practical reasons. The effective TGIC content of said mixture ranges from 10–70% (wt), particularly from 25–50% (wt).

The expression 'non-reactive polyester' is in this connection understood to mean that under the preparation and storage conditions of the TGIC composition the polyester does not appreciably react with the TGIC. Preference is given to using a polyester which essentially does not contain any free acid groups, because such groups often lead to reactivity of the polyester.

According to a suitable mode of realization the polyester used is a so-called non-functional polyester, i.e. a polyester which does not essentially contain any free acid groups or alcohol groups, in addition to the ester groups. As end groups in the molecules such polyesters contain groups derived from monovalent alcohols and/or monovalent acids. Examples of usable monovalent alcohols are aliphatic, aromatic and aliphatic/aromatic mono-alcohols with 1–20 carbon atoms per molecule, for instance methanol, ethanol, iso(propanol), butanol, 2-ethylhexanol and the natural fatty alcohols, such as palmityl alcohol, stearyl alcohol or oleyl alcohol, or also phenols, benzyl alcohol or phenylethyl alcohol. Examples of usable monovalent acids are aliphatic, aromatic and aliphatic/aromatic monocarboxylic acids with 2–20 carbon atoms per molecule, for instance acetic acid, butyric acid, caproic acid and the natural fatty acids, such as palmitic acid, stearic acid and oleic acid, or also phenylacetic acid. Particularly suitable are monovalent aromatic carboxylic acids, such as benzoic acid or its substituted derivatives, for instance o-methylbenzoic acid, p-methoxybenzoic acid.

According to another mode of realization the polyester applied is a so-called hydroxy-functional polyester. These can be obtained from the normal polyester ingredients of polyvalent alcohol and polyvalent acid without addition of monovalent alcohol or acid, in which case an excess of polyvalent alcohol is used. The hydroxyl value of such a polyester may be, for instance, 5–100, more specifically 25–65, calculated as mg KOH/g.

The acid component contained in the polyester to be used is preferably substantially a dibasic aliphatic, aromatic or aliphatic/aromatic carboxylic acid, for instance glutaric acid, adipic acid, suberic acid, azelaic acid, sebacic acid, 1,10-decanedicarboxylic acid or orthophthalic acid, terephthalic acid, isophthalic acid. The dibasic acids can be used either alone or in combination with each other. The preferred dibasic aromatic acid is terephthalic acid and the preferred aliphatic acid is adipic acid.

The alcohol component of the polyester to be applied preferably consists substantially of one or more aliphatic, aromatic or aliphatic/aromatic diols.

Examples of the aromatic diols are:
2,2-di-(4-beta-hydroxyethoxyphenyl)-propane;
2,2-di-(4-beta-hydroxyethoxyphenyl)-butane;
2,2-di-(4-hydroxypropoxyphenyl)-propane;
2,2-di-(3-methyl-4-beta-hydroxyethoxyphenyl)-propane; the polyoxyethylene or polyoxypropylene ether of 4,4¹-isopropylidenediphenol, in which the two phenol groups are ethoxylated or propoxylated and the average number of oxyethylene or oxypropylene groups is 2 to 6;
di-(4-beta-hydroxyethoxyphenol)-ketone and
di-(4-beta-hydroxypropoxyphenyl)-ketone.

The preferred aromatic diols are:
hexanediol-1,6, butanediol-1,4,
2,2-di-(4-beta-hydroxyethoxyphenyl)-propane and
2,2-di-(4-hydroxypropoxyphenyl)-propane.

The eligible divalent aliphatic alcohols are: hexanediol-1,6; butanodiol-1,4; 2,2-dimethylpropanediol-1,3; propyleneglycol-1,2; 1,4-cyclohexane-dimethanol and ethyleneglycol, which alcohols may contain groups other than hydroxyl groups, such as for instance diethyleneglycol. The divalent aliphatic alcohols can be used either alone or in combination with each other.

Both the acid component and the alcohol component may contain up to 10% 3,4 or polyvalent acids respectively alcohols, such as for instance trimesic acid, trimellitic acid respectively glycerol, trimethylolpropane; pentaerythritol, or a poly-functional hydroxy acid, such as for instance dimethylpropionic acid.

The invention also relates to a process for making a composition of TGIC with reduced tackiness in which TGIC and a non-reactive, preferably crystalline or crystallizable, polyester are mixed to form an at least partly liquid mixture and the resulting mixture is solidified.

A major advantage of the process of the invention is that liquid raw TGIC can be started from without prepurification. The raw TGIC may, for instance, have been prepared by converting cyanuric acid with epichlorohydrin followed by dehydrohalogenation.

The invention is elucidated by means of the following, non-restrictive examples.

EXAMPLE 1

Preparation of crystalline resin

To a reactor with a capacity of 3 liters, provided with a thermometer, a stirrer and a distiller, 1360 grammes hexanediol 1,6 and 1660 grammes terephthalic acid are supplied. Subsequently, during stirring, while a light nitrogen flow is passed over the reaction mixture, the temperature is raised to 250° C. In this process water is formed. After 350 grammes water has been caught, the acid number is 10.7. under reduced pressure the esterification is continued to acid number 2. This resin has the following values:
acid number: 1.8
OH number: 43
melting point: 139°–140° C.

EXAMPLE 2

Preparation of TGIC-composition 300 grams of the resin from example 1 is melted. At a temperature of 160° C. 300 grammes TGIC is added. After the mixture has been homogenized for 30 minutes, it is poured out and, after cooling, granulated.

The epoxy-equivalent weight of this product is 232.

EXAMPLE 3

Preparation of powder paint 516 grammes polyester resin with an acid number of 34 (Uralac P-2900 of DSM Resins) is mixed in dry condition with 84 grammes of the product from example 2, 300 grammes titaniumdioxide (KRONOS, Cl-310), 9 grams polyacrylate (Resiflow PV-5, 66% active, rest silica, Worlée) and with 4.5 grammes benzoin. This mixture is subsequently put in an extruder (make Buss, type PR-46). The extrudate is cooled, ground and screened, with the screen fraction smaller than 90 micrometers being caught and used as powder paint. This powder paint is applied by electrostatic spraying to steel panels previously degreased with trichloroethane. In this process an electrostatic spraying device make Gema, type HP-720, is used.

The steel panels sprayed with powder paint are put in a furnace and enamelled for 10 minutes at 200° C. The panels are judged for the following properties:
1. Gloss (visual): good
2. Reverse impact: 11 kg/cm$^2$ (160 psi)
3. Flow (visual): good
4. Powder stability (28 days 40° C.): good

EXAMPLE 4

Preparation of amorphous resin

To a reactor like the one described in example 1 1992 g terephthalic acid, 760 g propanediol-1,2, 576 g cyclohexanedimethanol and 3.0 g di-butyl-tin oxide are added.

Subsequently, during stirring, while a light nitrogen flow is passed over the reaction mixture, the temperature is raised to 230° C. In this process water is formed.

After 425 g water has been caught, the acid number is 11.1. Under reduced pressure the esterification is continued to acid number 2.

This resin has the following values:
acid number: 1.8
OH number: 4.4
melting point: 110°–115° C.

EXAMPLE 5

Preparation of TGIC-composition 300 g of the resin from example 4 is melted with TGIC and granulated as described in example 2.

The epoxy-equivalent weight of this product is 290.

EXAMPLE 6

Preparation of powder paint 510 g polyester resin with an acid number of 34 (Uralac P 2900 of DSM Resins) is mixed in dry condition with 90 g of the product of example 5, 300 g titaniumdioxide (KRONOS, Cl-310), 9 g polyacrylate (Resiflow-PV-5, 66% active, rest silica, Worlée) and with 4.5 g benzoin. This mixture is subsequently put in an extruder (make Buss, type PR-46). The extrudate is cooled, ground and screened, with the screen fraction smaller than 90 micrometers being caught and used as powder paint. This powder paint is applied by electorstatic spraying to steel panels previously degreased with trichloroethane. In this process an electrostatic spraying device make GEMA, type HP-720, is used.

The panels sprayed with powder paint are put in a furnace and enamelled for 10 minutes at 200° C. The panels are judged for the following properties:
1. Gloss (visual): good
2. Reverse impact: 11 kg/cm$^2$ (160 psi)
3. Flow (visual): good
4. Powder stability (28 days 40° C.): good

I claim:

1. Composition of triglycidylisocyanurate with reduced tackiness, wherein the preparation consists of a solid mixture of at least triglycidylisocyanurate and a non-reactive polyester, wherein said polyester is non-functional.

2. Composition according to claim 1, characterized in that the triglycidylisocyanurate content is 10–70% (wt).

3. Composition according to claim 1, characterized in that the triglycidylisocyanurate content is 25–50% (wt).

4. Composition according to claim 1, characterized in that the polyester applied is crystalline.

5. Composition according to claim 1, characterized in that the end groups of the polyesters are derived from aliphatic, aromatic and aliphatic/aromatic monoalcohols with 1–20 carbon atoms per molecule.

6. Composition according to claim 1, characterized in that the end groups of the polyesters are derived from aliphatic, aromatic, aliphatic/aromatic monocarboxylic acids with 2–20 carbon atoms per molecule.

7. Process for making a composition of triglycidylisocyanurate with reduced tackiness, characterized in that triglycidylisocyanurate is mixed with a non-reactive polyester to form at least partly liquid mixture and the resulting mixture is solidified.

8. Process according to claim 7, characterized in that the liquid raw triglycidylisocyanurate resulting from the preparation thereof is used without prior purification.

* * * * *